(12) United States Patent
Kuczynski et al.

(10) Patent No.: US 12,318,980 B2
(45) Date of Patent: Jun. 3, 2025

(54) METHOD OF MANUFACTURING AN OUTER SHELL OF A DISPENSER PART

(71) Applicant: Essity Hygiene and Health Aktiebolag, Gothenburg (SE)

(72) Inventors: Zbigniew Jan Kuczynski, Bialystok (PL); Helio Marto Jose, Marihna Grande (PT)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

(21) Appl. No.: 18/494,137

(22) Filed: Oct. 25, 2023

(65) Prior Publication Data
US 2024/0140008 A1    May 2, 2024

Related U.S. Application Data

(62) Division of application No. 16/629,807, filed as application No. PCT/EP2018/067122 on Jun. 26, 2018, now Pat. No. 11,878,450.

(30) Foreign Application Priority Data

Jul. 13, 2017    (EP) .................................... 17181157

(51) Int. Cl.
  *B29C 45/16*    (2006.01)
  *B65D 83/00*    (2006.01)
  (Continued)

(52) U.S. Cl.
  CPC .......... *B29C 45/1657* (2013.01); *B65D 83/00* (2013.01); *A47K 5/12* (2013.01);
  (Continued)

(58) Field of Classification Search
  CPC ................................................ B29C 45/1657
  See application file for complete search history.

(56) References Cited

U.S. PATENT DOCUMENTS 4,261,947 A    4/1981 Ogi
5,465,856 A    11/1995 Sheffler
(Continued)

FOREIGN PATENT DOCUMENTS

CN    102026788 A    4/2011
CN    102026790    *    4/2011
(Continued)

OTHER PUBLICATIONS

Brazilian Patent Application No. BR112019025197-9 filed Jun. 26, 2018; Search Report and Written Opinion dated Apr. 30, 2022; 4 pages.
(Continued)

*Primary Examiner* — Edmund H Lee
(74) *Attorney, Agent, or Firm* — CANTOR COLBURN LLP

(57) ABSTRACT

An outer shell for a dispenser and a method for making same are provided, the outer shell including first and second injection molded plastic component parts. The first and second component parts each include an outer surface and an inner surface, with the first component part having a first mating surface directed to the outer surface of the first component part and the second component part having a second mating surface directed to an inner surface of the second component part. The first and second component parts are joined to each other along a seam by mating the first mating surface and the second mating surface during injection moulding. A plurality of recesses is formed in the inner surface of the first component part along the seam and/or on a gate protrusion extending away from a free end of the first mating surface of the first component part.

7 Claims, 7 Drawing Sheets

(51) Int. Cl.
  *A47K 5/12* (2006.01)
  *A47K 10/32* (2006.01)
  *B29C 45/14* (2006.01)
  *B29K 55/02* (2006.01)

(52) U.S. Cl.
  CPC ...... *A47K 10/32* (2013.01); *A47K 2010/3233* (2013.01); *B29C 2045/14122* (2013.01); *B29C 2045/14131* (2013.01); *B29C 2045/1682* (2013.01); *B29K 2055/02* (2013.01)

(56) References Cited

U.S. PATENT DOCUMENTS

| | | | |
|---|---|---|---|
| 7,982,190 | B2 | 7/2011 | Homma et al. |
| 8,609,216 | B2* | 12/2013 | Zajtai ................. B29C 45/1657 428/58 |
| 8,733,571 | B2* | 5/2014 | Zajtai .................... A47K 10/24 403/265 |
| 8,905,263 | B2 | 12/2014 | Becherer et al. |
| 9,199,759 | B2 | 12/2015 | Mtt et al. |
| 9,370,888 | B2* | 6/2016 | Zajtai .................... B65D 83/00 |
| 10,099,412 | B2 | 10/2018 | Zajtai ................. B29C 45/1657 |
| 2009/0127738 | A1* | 5/2009 | Smith ................ B29C 45/1639 264/254 |
| 2009/0196675 | A1 | 8/2009 | May et al. |
| 2011/0049196 | A1 | 3/2011 | Sturk |
| 2011/0101030 | A1 | 5/2011 | Csaba et al. |

FOREIGN PATENT DOCUMENTS

| | | | |
|---|---|---|---|
| CN | 103101151 | A | 5/2013 |
| CN | 105835310 | B | 1/2021 |
| CO | 2020011565 | A2 | 3/2021 |
| EP | 0031620 | A2 | 7/1981 |
| JP | 02179714 | * | 7/1990 |
| JP | H03261527 | A | 11/1991 |
| JP | 200210978 | * | 8/2000 |
| JP | 2007030291 | A | 2/2007 |
| JP | 2011005743 | A | 1/2011 |
| JP | 2014176974 | A | 9/2014 |
| RU | 2501651 | C2 | 12/2013 |
| WO | 2009138452 | A1 | 11/2009 |
| WO | 2009138453 | A1 | 11/2009 |
| WO | 2009138454 | A1 | 11/2009 |
| WO | 2009138456 | A1 | 11/2009 |
| WO | 2013007302 | A2 | 1/2013 |
| WO | 2014142062 | A1 | 9/2014 |
| WO | 2015167371 | A1 | 11/2015 |

OTHER PUBLICATIONS

Chinese Patent Office, Decision Of Rejection, Chinese Applicatioin No. 201880045824.7, dated Jul. 13, 2021 (15 pages).
Colombian Patent Office, Office Action 16032, Application No. NC2020/0000431, mailed Oct. 14, 2021 (9 pages).
International Searching Authority, International Preliminary Report on Patentability issued in PCT/EP2018/067122 dated Jul. 17, 2019 (15 pages).
International Searching Authority, Search Report and Written Opinion issued in PCT/EP2018/067122 dated Oct. 8, 2018 (16 pages).
Russian Patent Office, Federal Service for Intellectual Property, Decition to Grant issued in RU 2020106296 dated Sep. 22, 2020 and English Translation (17 pages).

* cited by examiner

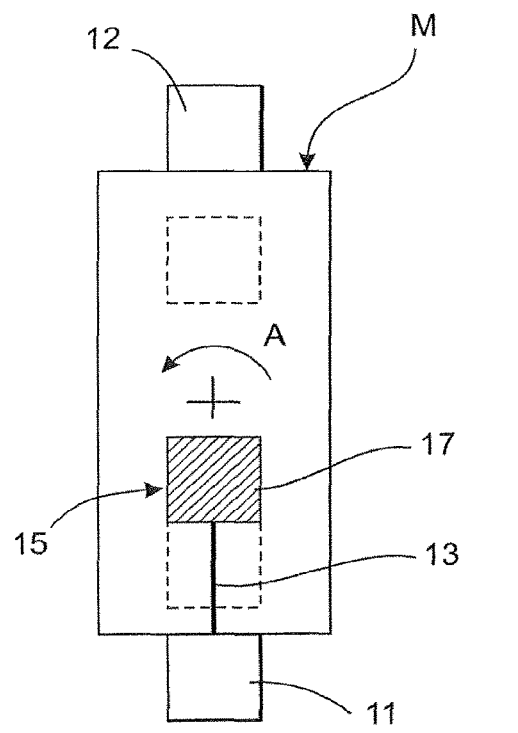
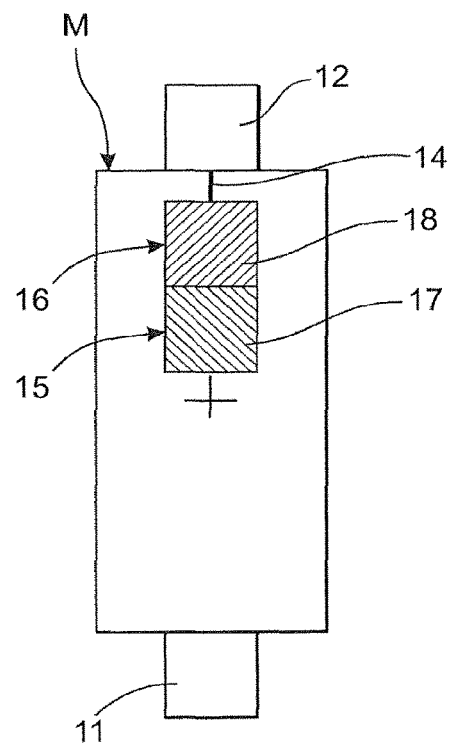
Fig.1A  Fig.1B
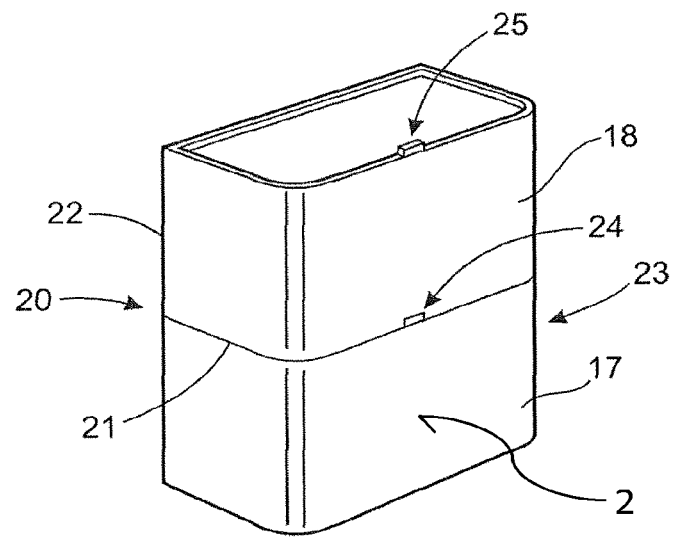
Fig.2

METHOD OF MANUFACTURING AN OUTER SHELL OF A DISPENSER PART

CROSS-REFERENCE TO RELATED APPLICATIONS

This application is a Division of U.S. application Ser. No. 16/629,807 filed on Jan. 9, 2020, now U.S. Pat. No. 11,878,450, which is a national phase entry of, and claims priority to, International Application No. PCT/EP2018/067122, filed Jun. 26, 2018, which claims priority to European Patent Application No. 17181157.3, filed Jul. 13, 2017. The above-mentioned patent applications are incorporated herein by reference in their entireties.

TECHNICAL FIELD

This application relates to dispensers, in particular outer shells for dispensers including at least two components selected from a range of plastic materials, with the components being joined along a seam.

BACKGROUND

In many types of dispensers, it is for various reasons often desirable to provide an outer shell comprising two component parts made from similar or different plastic materials. For instance, it is possible to make a first component part of the outer shell transparent in order to facilitate checking the level of a consumable product contained within the dispenser. A second component part can be made opaque in order to hide a dispensing mechanism, to allow monitoring of the filling level and to provide a dispenser (outer shell) with an aesthetically pleasant appearance.

When producing such an outer shell, the first component part is usually injection molded by injecting a first component material in a first mould and transferred to a second mould to be joined by a subsequently injected component for forming and joining the second component part.

An outer shell manufactured in this way may have problems with distortion of at least the first component part as well as of the seam connecting the first and second component parts. The component parts are usually joined end-to-end and even with local reinforcements and the seam may lack sufficient strength to withstand the forces, it may be expected to withstand. For example, the front of the outer shell may be exposed to accidental or intentional point loading, such as an impact force caused by an object or a person striking the dispenser. A weak seam may cause the outer shell to crack along at least part of the front surface (outer surface of the shell) requiring the outer shell to be replaced.

In order to alleviate this problem, International PCT Patent Application Publication No. WO 2009/138452 A1 or International PCT Patent Application Publication No. WO 2009/138456 A1 suggest a double injection molding process for producing and joining the first component part and the second component part along the seam in one mould. In particular, the first and second component parts are joined to each other along a seam by mating a first mating surface and a second mating surface during injection molding. Thus, distortion of the outer shell is reduced and the strength of the seam is increased.

Yet, during injection molding of the second component part overflowing of the second component plastic material beyond the seam was experienced. This overflowing plastic material covered a part of the inner surface of the first component part producing some kind of ridges or protrusions on the inner surface of the outer shell. However, some applications such as dispensers as shown in International PCT Patent Application Publication No. WO 2015/167371 A1 and International PCT Patent Application Publication No. WO 2013/007302 A2 require a smooth inner surface without any obstructions in order to prevent the products to be dispensed from the dispenser from being caught or damaged when moving along the inner surface of the outer shell.

Thus, it would be desirable to provide an outer shell of a dispenser as well as a method for manufacturing such an outer shell, which reduces and/or prevents any overflow and thus projections on the inner surface of the outer shell during the injection molding process.

SUMMARY

To address these and other problems with conventional designs, an outer shell of a dispenser is provided as described below as well as a method for manufacturing such an outer shell as described below.

In known injection molding processes, the first component part is formed by injection molding in the mould. The first component part is retained in the mould in order to form the second component part and join the first component part and the second component part along the seam. It has been found that the position of the first component part or at least portions thereof change before injecting the second component material for forming the second component part. This may be caused by shrinking of the first component part, movement of the first component part during transfer of the mould from a first cavity (comprising the negative of the first component part) to a second cavity (comprising the negative of the second component part) and/or movement of the first component part caused by the injection pressure when injecting the second component material. An incorrect positioning in potentially critical portions, such as along the seam or in an area of a gate portion, i.e. the portion at which the plastic material is injected, has been perceived most problematic in regard of the mentioned overflow.

In order to address this problem, it is suggested retaining or fixing the first component part to protrusions protruding from the mould when forming the first component part by injecting the first component material into the mould. In other words, the first component material will cover the protrusions, whereby recesses are formed in the first component part. The engagement of the protrusions of the mould with the recesses of the first component part enable a fixation of the first component part within the mould counteracting any displacement because of shrinking or a movement of the mould from the first cavity to the second cavity or due to the injection of the second component material for forming the second component part. Thus, the relevant portions of the first component part are fixed in position in the mould, thereby preventing or at least minimizing a possibly occurring overflow.

The present application relates to outer shells for dispensers, in particular for dispensers for consumable materials in restaurants, restrooms or similar. Dispensers of this type may be intended for rolls or stacks of paper or other wiping materials, or for washing substances such as liquid hand cream, soap or other detergents.

In the subsequent text, terms such as front, rear, inner and outer are defined in relation to a visible outer front or side surface of the outer shell itself. In addition, the term "seam" is used as a general term defining any seam or joint suitable for joining two component parts comprising plastic material into a single part. In general, the term "outer shell" is used to denote a structural part of a dispenser, which is visible to a user of the dispenser. Also, the term "component part" is used to denote each injection molded component that is joined with one or more additional component parts to form an outer shell.

According to one embodiment, an outer shell for a dispenser is suggested, the outer shell comprising a first injection molded plastic component part and a second injection molded plastic component part. When referring to an "outer shell" in the subsequent text, this term refers to an outer shell or an outer cover of a dispenser for paper wipes/towels, coreless rolls, plastic or paper cups, liquid soap/cream or similar dispensers. The outer shell comprises two component parts made from the same or different plastic materials in any desired combination of opaque, semi-opaque, semi-transparent or transparent form. The component parts making up the outer shell may also have functionally different properties, wherein the component parts may comprise a cover joined to a cutting device using the method provided. The first and second component parts each comprise an outer surface and an inner surface. As previously mentioned, the outer surface is the surface of the outer shell or the dispenser which is at least partly visible to the user, whereas the inner surface is a surface of the outer shell directed to the interior of the dispenser. The inner surface may even come into contact with the to be dispensed product such as paper products as previously mentioned. The first component part has a first mating surface directed to the outer surface of the first component part and the second component part has a second mating surface directed to an inner surface of the second component part and the first and second component parts are joined to each other along a seam by mating said first mating surface and said second mating surface during injection molding. In order to accomplish the retaining or fixing of the outer shell in the mould, a plurality of recesses is formed in the inner surface of the first component part along at least a part of the seam and/or on a gate protrusion extending away from a free end of the first mating surface of the first component part. The gate protrusion is that part of the first component part at which the first component plastic material is injected into the mould at the time of forming the first component part. In one example, the gate protrusion may be a partly (e.g. half) circular protrusion extending from the free edge or free end of the first mating surface. Because of the recesses, it is possible to retain the first component part within the mould and thereby counteract any tendencies of the first component part to displace before the second component part is injected and joined with the first component part along the seam. Thus, overflow of the second component plastic material over the first component part along the seam and/or the gate protrusion may be minimized or even be prevented. Thus, any unintentional protrusions or ridges on the inner surface of the outer shell, i.e. the first component part and the second component part, may be avoided.

In order to even enhance the fixation of the first component part in the mould, it may be beneficial that the recesses are provided with an undercut. Thus, the fixation is not only achieved by a force fit, but also a form fit in the direction of demolding the outer shell and, hence, also the first component part from the mould.

According to another embodiment, an undercut angle resides between 3° and 20°, preferably 5° to 15° and most preferably 8° to 13°. In this context, the skilled person will have to consider the flexibility of the plastic material. In the example of a standard ABS or MABS as explained later, the undercut angle can be large and an angle of up to 10° has been proven a good compromise between retaining the first component part in the mould and demold-ability, i.e. disengagement of the protrusions and the recesses during demolding. If other materials are used which are less flexible, such as PC (polycarbonate), lower undercut angles will have to be selected.

According to a further embodiment, the recesses are arranged in a row. The row may be a straight line or a curved line. It has been found that arranging a plurality of recesses in a row, which are smaller in size as compared to a larger recess, provide for a better engagement of the plastic material (recesses) with the protrusions and, hence, a better fixation of the first component part in the mould.

According to yet another embodiment, the depth of the recesses is lowest at opposite ends of the row and highest in a center between the opposite ends. In particular, it may be preferable to particularly retain the first component part in the mould at positions at which the first component part tends to separate from the mould because of shrinking or movement of the mould from one cavity to another. In these portions, for example a center or tip of the gate protrusion, the recesses are deeper than in portions close to the free edge of the seam from which the gate protrusion extends.

The recesses may have a rectangularly shaped top view, particularly a square shaped top view or a circular or oval shaped top view. The distance between two adjacent recesses and their width or diameter in top view are primarily adapted in view of the molding characteristics, the desired strength of the first component part in the portion of the recesses and the desired retaining of the first component part in the mould. The distance between two adjacent recesses needs to be sufficiently large that the plastic material may flow in between the two protrusions. In addition, the recesses weaken the first component part so that the dimensions of the recesses as well as their distance should be selected in accordance with the respective requirements of rigidity of the outer shell.

Yet, if a rectangular recess is used, one edge of the rectangle may extend parallel to the free end of the first mating surface and/or a free end of the gate protrusion.

In some embodiments, when the seam extends from one free edge of a side surface of the outer shell to an opposite side edge of another side surface of the outer shell, it may be that the recesses extend along the entire length of the seam. Yet, also in cases in which the first component part is surrounded by the second component part, the recesses may extend along the entire length of the seam.

In order to avoid any steps or protrusions or ridges at the inner surfaces of the outer shell and/or to provide for a pleasant outer appearance of the outer shell, the outer surfaces and/or inner surfaces of the first and second component parts are flush along the seam.

In order to improve the joining of the first and second component parts during the injection molding, the first mating surface and said second mating surface are generally non-planar as described in more detail in International PCT Patent Application Publication No. WO 2009/138456 A1 or International PCT Patent Application Publication No. WO 2009/138452 A1 which are herewith incorporated by reference in their entireties.

In one example, the first component part is made of MABS and said second component part is made of ABS.

In a particular example, the second component part is an opaque ABS plastic material.

In a further example, the first component part is a transparent MABS plastic material.

In one embodiment, the first and second component parts each further include a first side surface and a second side surface, with the first and second side surfaces each having a free edge facing away from the outer surface, and the seam extends from the free edges of the first side surfaces to the free edges of the second side surfaces. Such an example is for example shown in FIGS. 2, 13 and 15 below. In this context, the term "side surface" does not necessarily define a lateral side surface (left and right side surface) but also encompasses a top and/or bottom side surface. In view of this understanding, the seam may extend in any direction over a front surface or outer surface of the outer shell from one lateral side surface to another lateral side surface, between the bottom side surface and the top side surface or even between a lateral side surface and a bottom or top side surface. Thus, the seam may extend horizontally, vertically, diagonally in a straight, wavy or curved shape.

A method of manufacturing an outer shell of a dispenser part is also provided in accordance with embodiments of the invention. In the method, a first injection molding step is performed to produce a first component part of the outer shell in a mould. More particular, the first component part of the outer shell is formed in a first volume defined by the mould and a second mould (first cavity). The first component part comprises an outer surface and an inner surface, wherein the first component part has a first mating surface directed to the outer surface of the first component part. The mould has a surface being the negative of the inner surface of the first component part, whereas the second mould has a surface being the negative of the outer surface of the first component part and of the mating surface. After the first component part has been formed, the first component part is retained in the mould and engaged with a plurality of protrusions provided on the surface of the mould. When injection molding the first component part, the first component plastic material flows around the protrusions, wherein the recesses are formed in the first component part. Thus, the first component part and the protrusions are engaged and the first component part is securely held at the mould. The protrusions are provided on the surface of the mould corresponding to the inner surface of the first component part and along at least a part of an inner end of the first mating surface of the first component part and/or on a gate protrusion extending away from a free end of the first mating surface of the first component part. Subsequently, a second injection molding step is performed to produce a second component part in the mould, wherein the second component part comprises an outer surface and an inner surface, wherein the second component part has a second mating surface directed to an inner surface of the second component part. More particular, the second component part of the outer shell is formed in a second volume defined by the mould and a third mould (second cavity). The mould further has a surface being the negative of the inner surface of the second component part, whereas the third mould has a surface being the negative of the outer surface of the second component part. The mating surface of the first component part is also part of the negative of the second component part for forming the mating surface of the second component part. In other words, the mating surface of the first component part is within the second volume. Thus, the first and second component parts are joined to each other along a seam by mating said first mating surface and said second mating surface during the second injection molding step. As will be clear from the above, the method for making the outer shell involves using a single mould and producing the outer shell using a two component injection molding process. The two component injection molding process involves performing a first injection molding step to produce at least a first component part in said mould, retaining the at least one part in the mould, and performing a second injection molding step to produce at least a second component part in said mould and to complete the outer shell. The mould is located in a first position during the first injection step and is then moved or rotated to a second position in which the second injection step and the subsequent cooling is performed. In its simplest form, the method is used to make an outer shell with a single first and second component part. Such an outer shell may comprise an upper first component part of a first material being transparent, and a lower second component part of a second material being opaque or vice versa. However, a number of variations are possible. For instance, an outer shell may comprise a transparent first component part extending horizontally across a central portion of the outer shell and upper and lower opaque second component parts or vice versa. According to the disclosure, when the outer shell comprises more than one first and one second component part, all first component parts are molded in the first injection molding step and all second component parts are molded in the second injection molding step. The first component part is retained in the mould after the first injection molding step in order to maintain the shape of the first component part as it begins to cool and to maintain the first component part at an elevated temperature until the second injection molding step has been completed. The first component parts are all fixed in position by use of the protrusions as explained above. The finished outer shell may then be cooled and removed from the mould.

In view of the above, it is emphasized that the protrusions of the mould provide for the negative of the recesses resulting in the outer shell, particularly the first component part of the outer shell. Thus, the description above with respect to the recesses also applies for the protrusions of the mould and vice versa.

Accordingly, the protrusions may be provided with an undercut.

The undercut angle may reside between 3° and 20°, preferably 5° to 15° and most preferably 8° to 13°.

The protrusions may be arranged in a row.

The height of the protrusions may be lowest at opposite ends of the row and highest in a center between the opposite ends.

The protrusions may have a rectangularly shaped top view, particularly a square shaped top view, or a circular shaped or oval shaped top view.

One edge of the rectangle may extend parallel to the free end of the first mating surface and/or a free end of the gate protrusion.

Further and as previously mentioned, the mould is moved, particularly rotated, from a first cavity to a second cavity between the first injection molding step and the second injection molding step while retaining the first component part in the mould. More particularly, the combination of the mould with the first cavity define a first volume corresponding to the first component part and the combination of the mould and the second cavity define a second volume corresponding to the second component part. In the second injection molding step, the plastic material of the first component part and the second component part at the mating surfaces melts and the first and second component parts are joined.

In one embodiment, each first edge (free edge or end of the first component part at an end of the mating surface) of the at least one first component part may be molded to form at least one step in a transverse direction to the first edge. The at least one step is preferably, but not necessarily, molded along each first edge from the first to the second side edge of the first component part.

For each first component part the at least one step may be molded to form a first contact surface at right angles to an inner and/or an outer surface of the outer shell, and a second contact surface extending towards the first edge. Hence, the second contact surface is arranged to extend between the inner and outer surfaces, both in the transverse and longitudinal direction of the seam. To put it differently, the transverse cross-section of the seam comprises a first step adjacent and at substantially right angles to the outer surface of the outer shell. The at least one step extends along each first edge and, according to an example, from the first to the second side edge. Each at least one step may form a first contact surface at right angles to an inner or an outer surface of the outer shell, and a second contact surface extending towards the first edge. The second contact surface may be molded to form raised contact increasing structure along the length of the seam, preferably along the entire length of the seam. The raised contact increasing structure will melt upon contact with the material injected during the second injection molding step.

Each first edge of the first component part may be injection molded to form at least two steps. This may be achieved by molding the first edge to form a third contact surface at right angles to an outer and/or an inner surface of the outer shell. For instance, in its simplest form, the seam may comprise a first contact surface at right angles to an outer surface of the outer shell, and a second contact surface extending towards the first edge. The seam is completed by a third contact surface at right angles to an inner surface of the outer shell.

According to one example, the method involves molding the raised contact increasing structure to form at least one additional step in the second contact surface between the first and third contact surfaces. The height of the steps may be selected depending on the thickness of the dispenser wall adjacent the seam. This thickness is preferably measured at right angles to the front surface of the thinner of the component parts immediately before the seam. The height of the additional steps may for instance be selected in a range from 0.05 mm to 2 mm. The steps are preferably, but not necessarily, given an equal height. For instance, in a seam connecting a transparent and an opaque part, the first step adjacent the outer surface of the outer shell is preferably, but not necessarily, larger than the additional steps. This gives a distinct line separating the two parts and facilitates filling of the mould adjacent the edge of the first component part during the second injection molding step. An opaque material having a thicker first step adjacent the seam will also prevent this portion of the outer shell from becoming partially transparent. For instance, a dispenser wall or outer shell may have a constant total thickness of 1 mm to 6 mm, preferably 2.5 mm to 4.5 mm, adjacent the seam. A first step provided adjacent the outer surface and a first step provided adjacent the inner surface may each have a height of 0.2 mm to 1 mm. These first and second steps may be separated by a number of intermediate additional steps with a height of 0.05 mm to 1 mm. The intermediate steps are preferably, but not necessarily, of equal height. The separation between each adjacent step may be a distance equal to or greater than the height of the smaller of said steps. Each corner of the said additional steps will melt during the second injection molding step. When the molten material injected during the second injection molding step reaches the solidified edge of the first component part, the corners facilitate the melting together of the first and second component parts. In order to ensure this, the temperature of the material to be injected and/or the temperature of one or both mould(s) may be controlled to achieve the desired result. For instance, the temperature of the material injected at least during the second injection molding step may be selected above the recommended injection temperature for the particular material. As the second material flows through the mould towards the first component part, its temperature will gradually drop. However, as the initial temperature at the start of the injection is higher than normal, the temperature of the molten second material will still be sufficient to melt the edge of the solidified first component part. The temperature of the first component part may be controlled by adjusting the cooling of the mould.

In the embodiments described herein, the longitudinal direction of the seam is defined as the direction of the front edge of the respective component part where they are joined by the seam, or the general direction of the front edge should the edge be non-linear. The transverse direction of the seam in a particular location is defined as the direction at right angles to said front edge in the plane of the outer shell at said location.

The seam described in all of the above examples may have a transverse width extending over a distance of up to 5 times the thickness of the thinner of the first and second component parts, in a direction transverse to the direction of the seam between the component parts in the plane of said component parts. The transverse cross-sectional thickness of the outer shell at said seam may be between 1 mm and 6 mm, preferably between 2.5 mm and 4.5 mm.

In order to achieve a desired strength, the raised contact increasing structure is arranged to melt during the second injection molding step. It has been found that by providing steps formed by substantially right angled corners along the entire length of the seam, the formation of a homogenous, strong seam is achieved. When the molten material injected during the second injection molding step reaches the solidified edge of the first component part, the corners or projections facilitate the melting together of the first and second component parts. In order to ensure this, the temperature of the material to be injected and/or the temperature of one or both mould(s) may be controlled to achieve the desired result. For instance, the temperature of the material injected at least during the second injection molding step may be selected above the recommended injection temperature for the particular material. As the second material flows through the mould towards the first component part, its temperature will gradually drop. However, as the initial temperature at the start of the injection is higher than normal, the temperature of the molten second material will still be sufficient to melt the edge of the solidified first component part. The temperature of the first component part may be controlled by adjusting the cooling of the mould.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

FIG. 1A is a schematic top view of an arrangement for carrying out a molding process for making an outer shell according to the invention, with a mould in a first position.

FIG. 1B is a schematic top view of the arrangement of FIG. 1A, with the mould in a second position.

FIG. 2 is a perspective view of an outer shell made by the process according to the disclosure.

EMBODIMENTS OF THE DISCLOSURE

Figure 3:
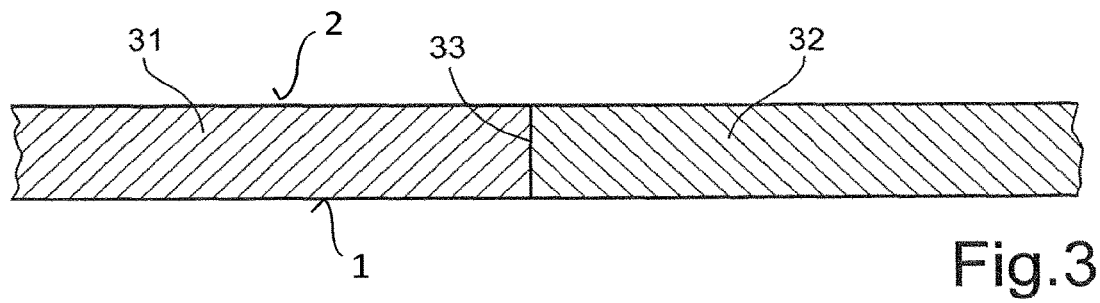
FIG. 3 is a cross-sectional view of a prior art seam.

FIGS. 1A and 1B show a schematic illustration of an arrangement for carrying out a two component injection molding process for making an outer shell according to embodiments of this invention.

In this example, the process uses two injection units 11, 12 and a rotary mould M designed for sequential injection of a single part using two different materials. In the subsequent text, the process is described for the injection of a transparent and an opaque material, but it is applicable for any combination of transparent and/or colored materials. The mould M used in this example is a two cavity mould. The mould M is held closed in a first cavity position shown in FIG. 1A and heated to a predetermined operating temperature. The first material, which is usually the material having the highest injection temperature, is injected from the first injection unit 11 through a primary runner system 13 into a first cavity 15 to form a first component part 17. In this example, the first material is a transparent or translucent resin. During the first injection, the mould volume to be occupied by the second material is shut off from the primary runner system. The mould is opened and a core plate 19 (mould) is rotated 180°, as indicated by the arrow A, into a second cavity position shown in FIG. 1B, where after the mould closes. A secondary runner system 14 is connected to the volume to be filled and the second material is injected from the second injection unit 12 into a second cavity 16 to form a second component part 18. In this example, the second material is an opaque resin. After sufficient cooling of the injected outer shell 17, 18, the mould is opened and the outer shell is ejected.

The tool design used in the described example is a rotating core plate. This comprises a two-station tool that rotates in a vertical (or horizontal) direction. The rotating plate is held in a first position at a first injection station for the injection of the first material. It is then rotated into a second position at a second injection station for the injection of the second material.

An alternative tool design is a core back. In a core back, a sliding core is first closed and the first material is injected. The sliding core is then opened and the second material is injected.

Figure 7:
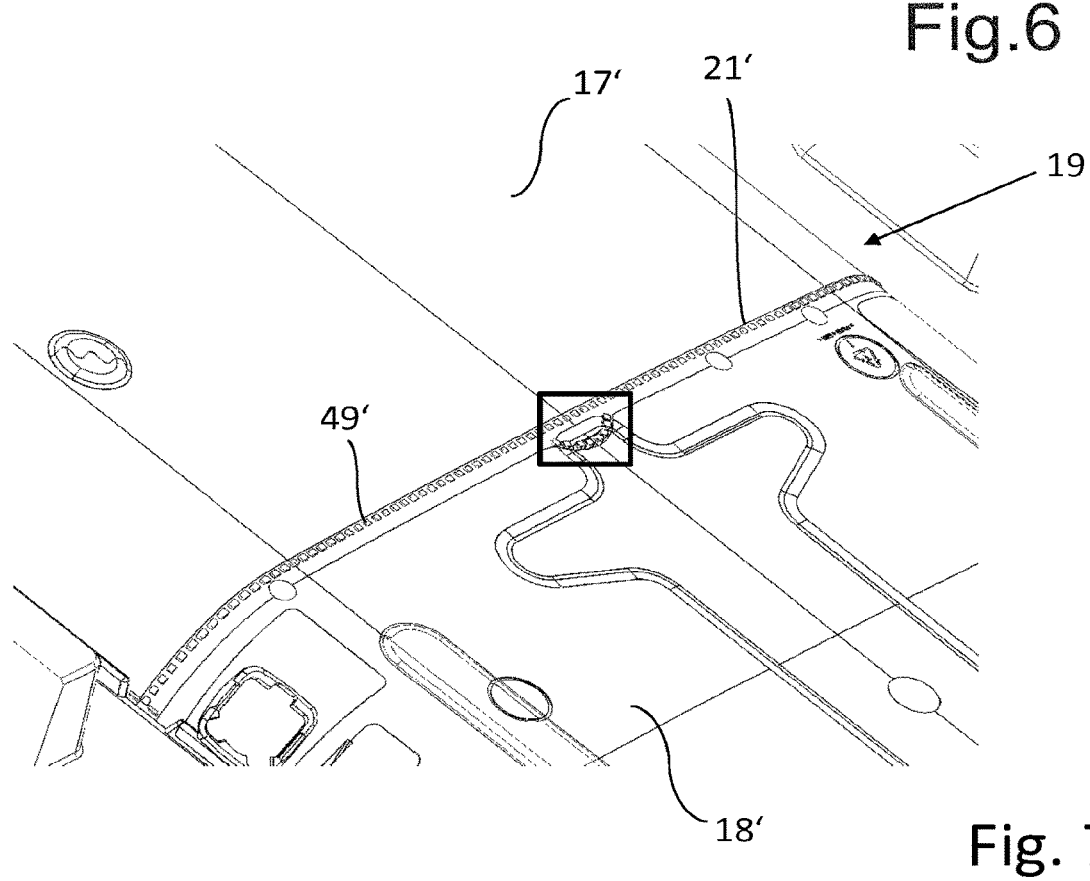
FIG. 7 is a partial top perspective view of the mould.
Figure 8:
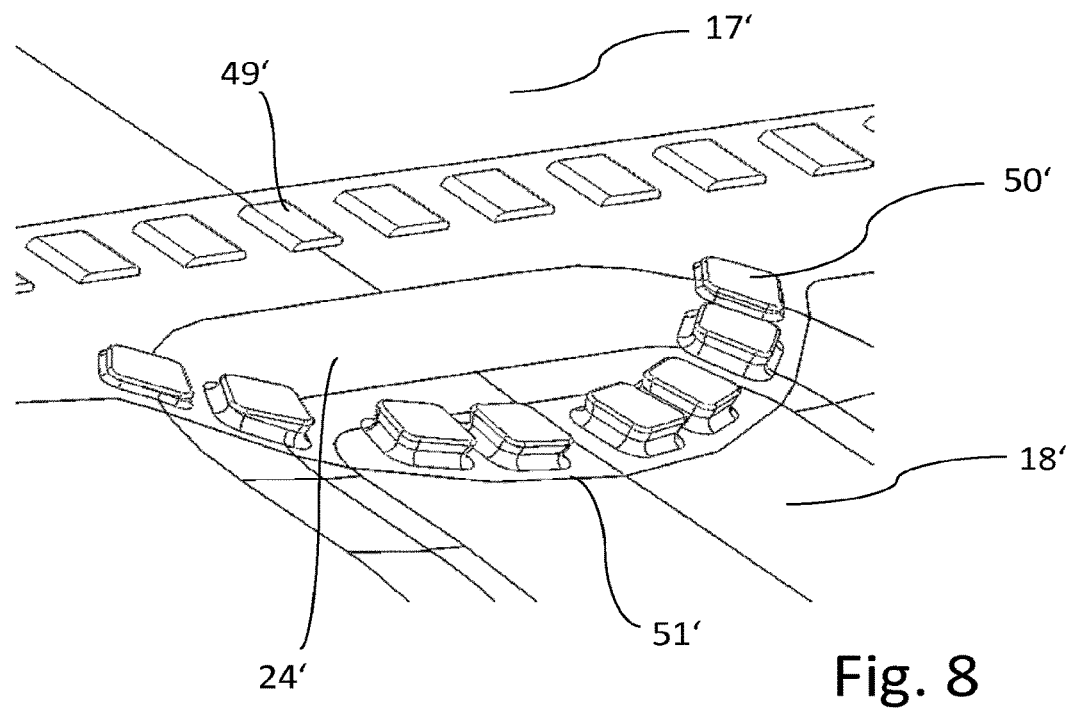
FIG. 8 is an enlarged detail perspective view of the mould of FIG. 7 corresponding to the detail rectangle shown in FIG. 7.

A portion of the core plate or back (also referred to as the mould) 19 is shown in more detail in FIGS. 7 and 8. The mould 19 comprises an outer surface divided into a first outer surface 17' corresponding to the inner surface of the first component part 17 and a second outer surface 18' corresponding to the inner surface of the second component part 18.

FIG. 2 shows a schematic illustration of an outer shell 20 made by the above process. The outer shell 20 is made up of the two component parts 17, 18 injected during the process shown in FIGS. 1A and B. Said component parts 17, 18 are joined along a seam 21 running from one side edge 22 to a second side edge 23 of the outer shell 20. FIG. 2 further indicates the gating location 24 for the primary runner system 13 and the corresponding gating location 25 for the secondary runner system 14.

One factor to consider during the process is the relative melt temperature of the two materials. As stated above, the material having the highest injection temperature is usually injected first. In order to ensure that the temperature of the second material is sufficient for at least partially melting a cooperating edge of the first material, the injection temperature of the second material can be increased. The increased temperature can be higher than the injection temperature recommended by the manufacturer, but not higher than the degradation temperature of the material.

In the above example, the first material was a transparent resin that was tested at two different injection temperatures. The second material was an opaque resin injected at the same temperature in both tests. These tests are described in further detail below.

Further factors are the mould wall temperature, the injection speed, the delay time between injections and the injected component part temperature. For instance, the mould wall temperature is controlled to maintain the first component part at a desired temperature during rotation of the first component into the second injection position. In this way, the edge of the first component will not cause the injected second material to cool before the cooperating edges have melted together. The temperature of both components can also be maintained during the consecutive injections in order to minimize distortion of the outer shell during the subsequent cooling of the complete outer shell. As each injection station is supplied by an independent injection unit, injection speeds and pressures can be accurately controlled and adapted for each material being injected.

In addition to the tool design, additional considerations are the wall thickness of the injected component, the surface structure of the part from the primary runner system to avoid venting problems, the tool surface and temperature for demolding, the gating location for optimum adhesion between component parts in dependence of the flow path and how the part will be demolded, causing a force to be applied to the adhesion area between component parts.

In order to increase adhesion between the contacting edges of the two materials, the seam has been given a particular configuration. A prior art seam, as shown in FIG. 3, made by joining the same, two materials were used as a reference sample. The prior art sample was subjected to a comparative test using samples comprising a number of alternative seams according to the disclosure and a sample comprising a length of a homogenous opaque material having the same thickness as the reference sample. The seam according to the disclosure is shown in FIG. 4.

FIG. 3 shows a schematic illustration of a prior art seam between a transparent first component part 31 and an opaque second component part 32. The first and second component parts 31, 32 have the same wall thickness and are joined end-to-end by a straight, flat seam 33.

Figure 4:
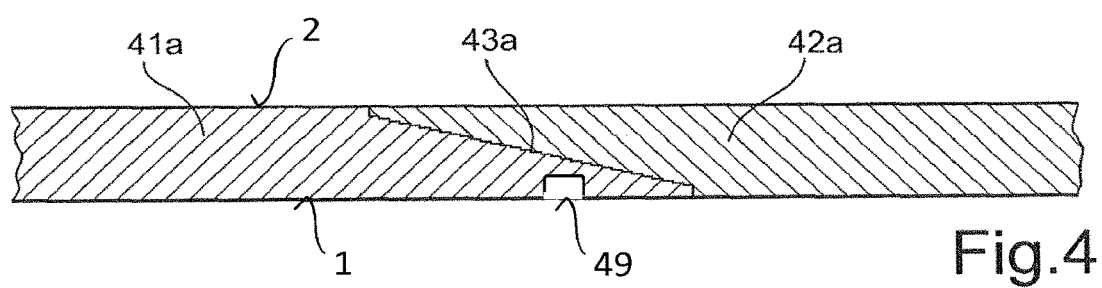
FIG. 4 is a cross-sectional view of a cross-section through a seam according to the disclosure.

FIG. 4 shows a schematic illustration of a cross-section through a seam according to the disclosure. FIG. 4 shows a transparent first component part 41a and an opaque second component part 42a. The first and second component parts 41a, 42a have the same wall thickness of 3 mm and are joined end-to-end by a seam 43a comprising a number of steps. The seam extends over a distance 2.5 times the thickness of the second component part 42a in a direction transverse to the direction of the seam 43a between the component parts. The front surfaces of the respective joined component parts are completely flush with each other along the seam. In the region of the seam, the leading edge of the second component part 42a is arranged to overlap the first component part 41a in order to hide the seam 43a. The seam 43a will be described in further detail below (see FIG. 5). In FIG. 4, the steps are shown as distinct steps with right angled corners for clarity. However, in the finished seam between two injection molded components, at least the corners of the contacting surfaces were melted to form a fused seam. In order to achieve a desired strength, each corner of the said steps is arranged to melt during the second injection molding step. It has been found that by providing steps formed by substantially right angled corners along the entire length of the seam, the formation of a homogenous, strong seam is achieved. When the molten material injected during the second injection step reaches the solidified edge of the first component part, the corners facilitate the melting together of the first and second component parts. In order to ensure this, the temperature of the material to be injected and/or the temperature of the mould may be controlled to achieve the desired result.

Figure 5:
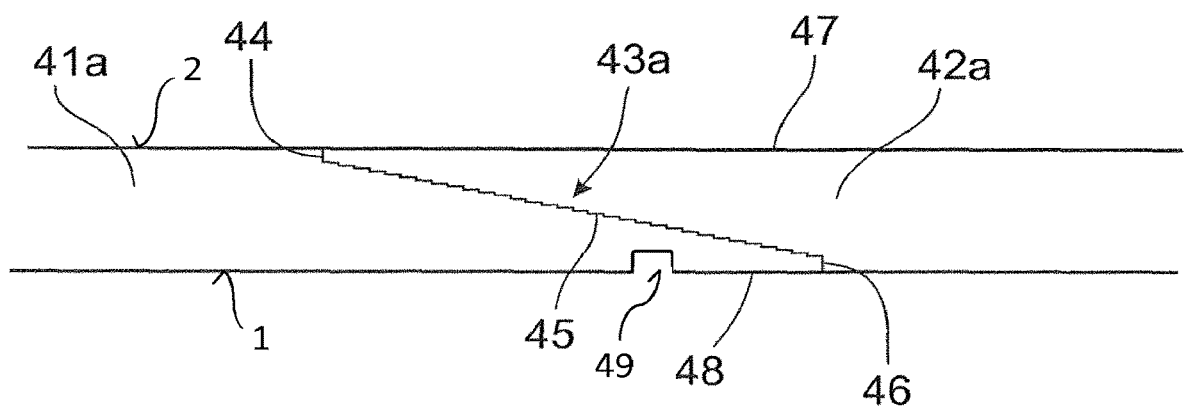
FIG. 5 is an enlarged view of the seam of FIG. 4.

FIG. 5 shows an enlarged view of the seam of FIG. 4 comprising a transparent first component part 41a and an opaque second component part 42a. The front edge of the first component part 41a is injection molded to form a number of distinct steps 44, 45, 46. The height of the steps is selected depending on the thickness of the dispenser wall adjacent the seam 43a. In this example, the dispenser wall thickness adjacent the seam is 3 mm and the height of the steps is selected based on this measurement. For instance, in a seam 43a connecting a transparent part 41a and an opaque part 42a, a first step 44 adjacent the outer surface 47 of the outer shell has been selected larger than a number of intermediate steps 45. This gives a distinct line separating the two parts 41a, 42a and facilitates filling of the mould adjacent the edge of the first component part 41a during the second injection molding step. A higher first step 46 adjacent the seam 43a will also prevent this portion of the outer shell from becoming partially transparent. Similarly, a final step 46 adjacent the inner surface 48 of the outer shell has been selected larger than the intermediate steps 45 to facilitate filling of the mould adjacent the edge of the first component part 41a. In the latter case, the steps 44, 46 provided adjacent both the outer and the inner surfaces 47, 48 have each been given a height of 0.2 mm. For a dispenser wall having a constant total thickness of 2 mm, these outer, first steps can be separated by a number of intermediate steps of 0.05 mm to 0.1 mm. In this case the intermediate steps have an equal height of 0.05 mm.

Figure 6:
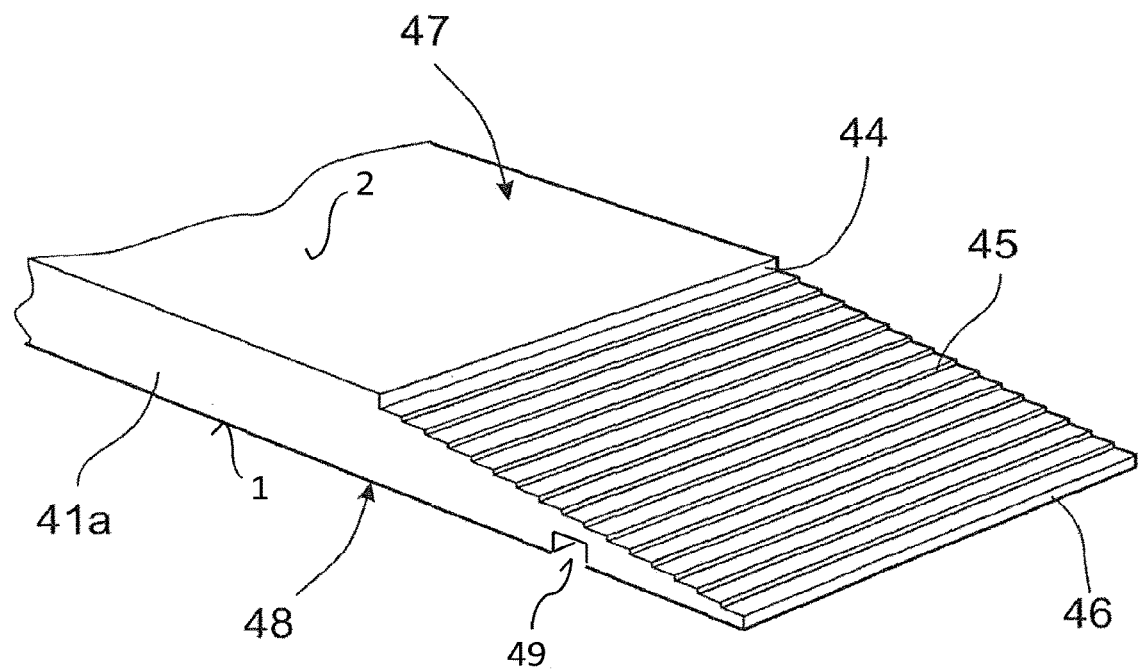
FIG. 6 is a perspective view of a first outer shell provided with multiple steps.

FIG. 6 shows a schematic enlarged section of a component part provided with multiple steps. This component part corresponds to the first component part 41a shown in FIG. 5. As described above, the front edge of the first component part 41a is injection molded to form a number of distinct steps 44, 45, 46 during a first injection molding step according to the disclosure. A first step 44 adjacent the outer surface 47 of the component part has a larger height than a number of intermediate steps 45. Similarly, a final step 46 adjacent the inner surface 48 of the component part has been selected larger than the intermediate steps 45 to facilitate filling of the mould adjacent the edge of the first component part 41a. The first component part 41a will be joined to the second component part 41b (see FIG. 5) during the second injection molding step.

Figure 10:
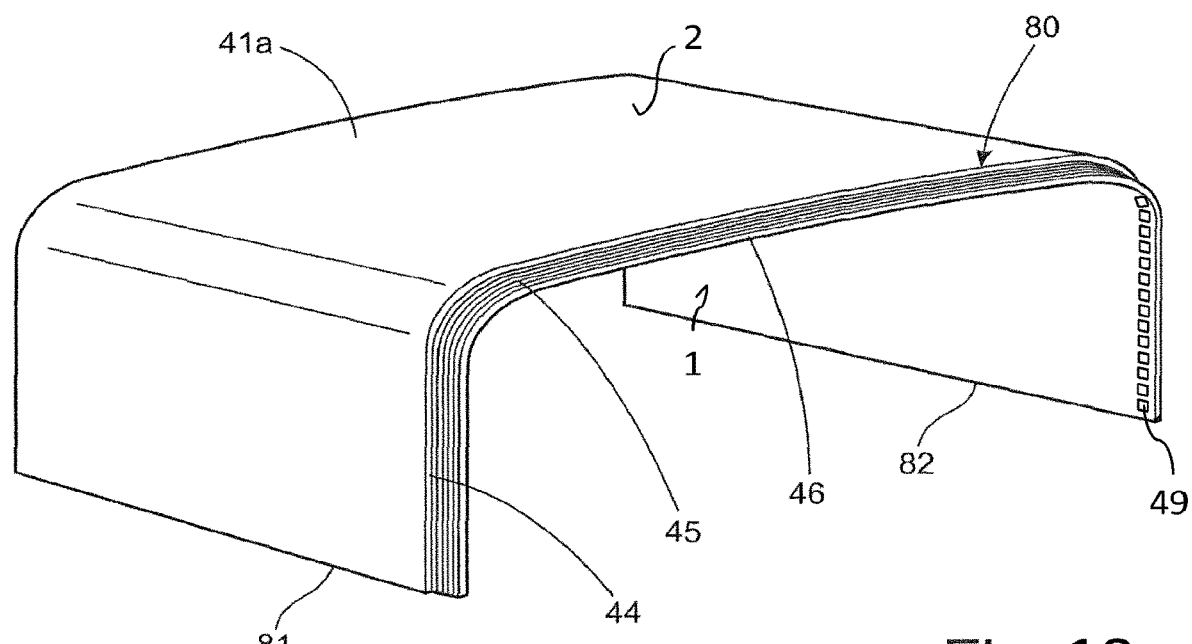
FIG. 10 is a top perspective view of an outer shell provided with a stepped edge as shown in FIG. 6.
Figure 11:
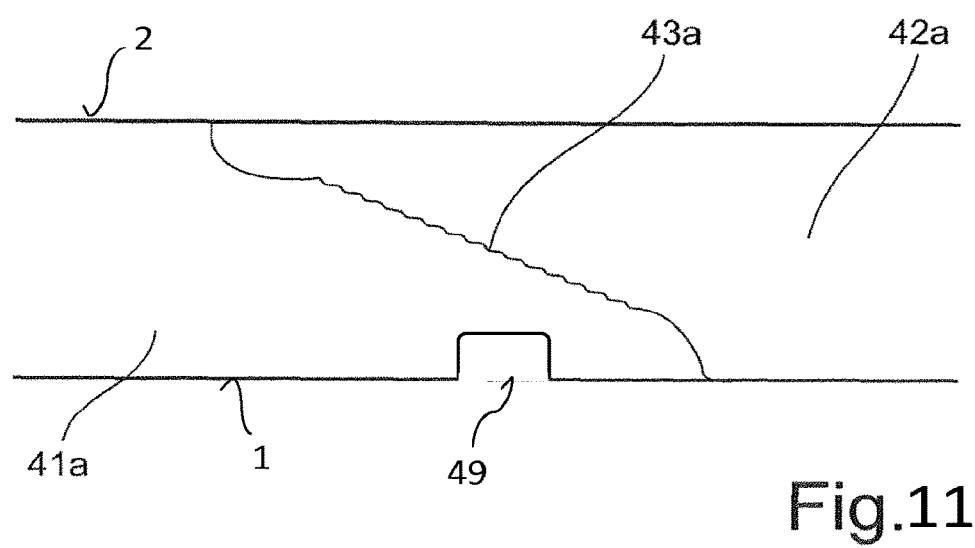
FIG. 11 is a cross-sectional view through another seam.

FIG. 10 shows a schematic illustration of the component part 41a provided with a stepped edge 80 comprising a number of distinct steps 44, 45, 46 as shown in FIG. 6. In FIG. 11 it can be seen how the stepped edge 80 extends continuously from one side edge 81 of the component part 41a to a second side edge 82. Also visible are a plurality of recesses 49 extending along the stepped edge 80.

Figure 12:
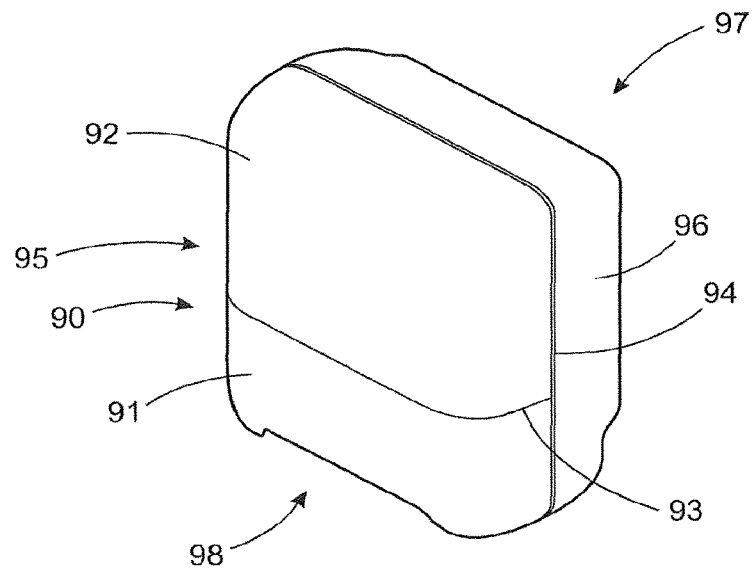
FIG. 12 is a perspective view of a dispenser comprising an outer shell according to one embodiment of the invention.

FIG. 11 shows an illustration of actual photographs of cross-sectional samples through an outer shell corresponding to the schematic cross-sections shown in FIG. 4. In FIG. 12, the outer shell has been cut in a transverse direction of the seam between the first and second component parts. Hence, FIG. 1A, corresponding to FIG. 4, shows a transparent first component part 41a and an opaque second component part 42a. The first and second component parts 41a, 42a have the same wall thickness of 3 mm and are joined end-to-end by a seam 43a comprising a number of steps. As can be seen from the Figure, the contact surfaces have been joined and the corners of the distinct steps were melted to form rounded surfaces and merged with the second component part 42a during the second injection molding step.

Moreover, a plurality of recesses 49 is formed in the inner surface 1 of the first component part 17 or 41a (FIGS. 2 and 4 to 6). The recesses 49 in the particular example do not have an undercut but may also be formed with an undercut at a specific undercut angle.

Figure 9:
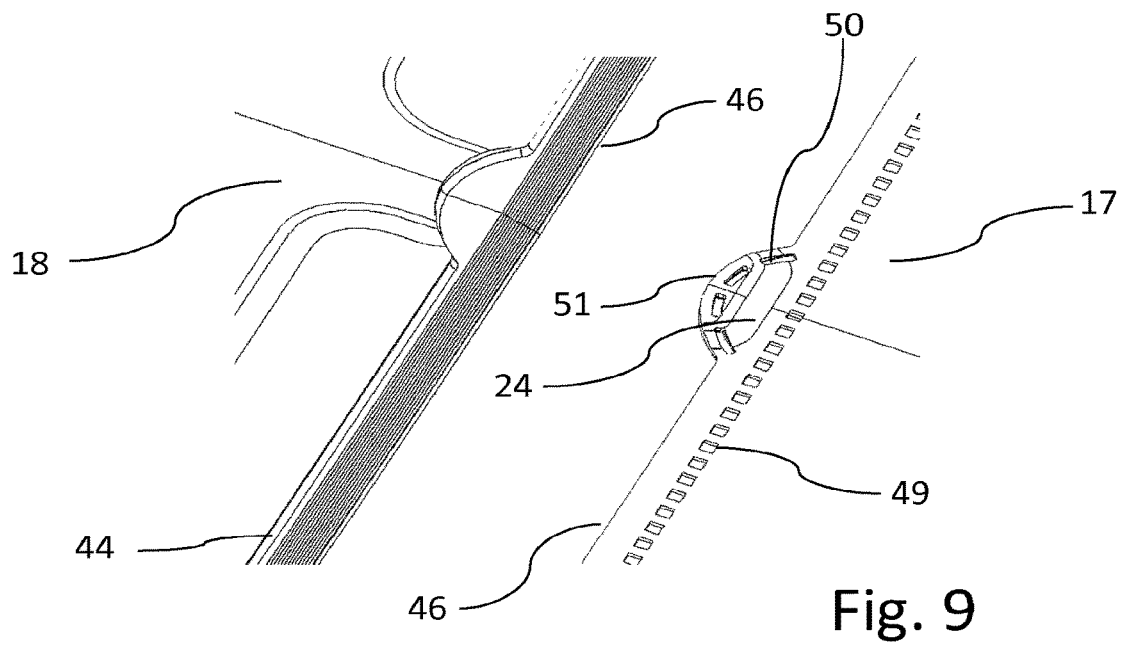
FIG. 9 is a partial perspective exploded view towards the inner surface of an outer shell.

On the other hand, FIG. 9 also shows a number of recesses 50 which extend along a free edge 51 of a gate protrusion 24 extending from the free end 46 of the mating surface and having a partly circular shape. These recesses 50 comprise an undercut at an undercut angle in the particular example 10°. Yet, different undercut angles may be selected depending on the used material and the circumstances as explained earlier.

The undercut angle is defined as an angle of the side wall of the recess 49, 50 in cross-section relative to a line perpendicular to the inner surface of the first component part 17 at the opening of the recess 49, 50.

The recesses 49, 50 particularly serve for retaining the first component part 17 in the mould 19 before injecting the second component plastic material for forming the second component part 18.

Thus, the recesses 49, 50 are formed by protrusions 49' and 50' of the mould 19 as shown in FIGS. 7 and 8. The protrusions 49' extend along the portion of the mould 19 at which the seam between the first component part 17 and the second component part 18 is to be located. This seam has been indicated at 21' in FIG. 7. As will be apparent from FIG. 7, the protrusions 49' extend along the entire length of the seam 21'. The protrusions 49' are more clearly depicted in FIG. 8 in enlarged scale. The protrusions 49' have a rectangularly shaped top view and rounded longitudinal side edges. Thus, the protrusions 49' taper starting from the surface 17' of the mould 19 so that there is no undercut. If the protrusions 49' are considered to be the negative, the recesses 49 as shown in FIG. 9 will be the positive of the protrusions 49'.

The recesses 50 shown in FIG. 9 are formed by protrusions 50'. The protrusions 50' are provided along a free edge or end 51' of the surface 17' of the mould corresponding to the free end 51 of the gate protrusion 24 (FIG. 9). Contrary to the protrusions 49', the protrusions 50' are provided with an undercut. For this purpose, the protrusions 50' may be mushroom headed. For example, the side walls or at least two opposite side walls of the protrusions 50' may be angled outwardly relative to a line perpendicular to the surface 17' of the mould 19 to provide for the undercut. In this particular example, the undercut angle, that is the inclination of the side wall of the protrusion 50' towards the outside and relative to a line perpendicular to the surface 17' in cross-section, is about 10°. In other words, the protrusions 50' widen or expand starting from the surface 17'.

Both, the protrusions 49' and 50' are disposed in a row. Yet, the protrusions 49' have the same height along the length of the seam 21'. To the contrary, the height of the protrusions 50' is highest in a center of the row and lowest at the opposite ends of the row as clearly visible from FIG. 8. This also applies to the recesses 49 and 50 formed by the protrusions 49' and 50'.

It is also clear that the protrusions 49' may be disposed at an equal pitch along the row (the distance between adjacent protrusions 49' is the same along the row) or grouped, each group consisting of a plurality of protrusions 50', such as two protrusions 50', wherein the protrusions within one group are disposed at an equal pitch (distance to each other) and the groups are positioned at an equal pitch, however different than the pitch of the protrusions 50' within one group. In the example in FIG. 8, there are four groups each consisting of two protrusions 50'. FIG. 9 shows an alternative configuration with respect to the recesses resulting from the protrusions 50'. In this context, four recesses 50 are shown which are disposed at equal pitch. It becomes also apparent that the recesses 50 in FIG. 9 are rectangular in top view, whereas the recesses 49 are square-shaped in top view. Yet, also circular recesses are conceivable.

The injection molding process incorporates as previously mentioned a first injection molding step in which the first component plastic material is injected into the first cavity 15. During this first injection molding step, first component plastic material flows around the protrusions 49' and 50'. Upon cooling, the so formed first component part 41*a* is fixed and retained by engagement of the recesses 49 and 50 with the respective protrusions 49' and 50'. Accordingly, the mating surface 43*a* of the first component part 43*a* is fixed in position within or on the mould 19 even during rotation in the direction A in FIGS. 1A and B and/or during shrinking when the plastic material is cooled. Thus, there is a negative provided by the mould 19 when closed to define the second cavity 16. Accordingly, any overflow of second component plastic material during the second injection molding step may be avoided. Thus, the inner surface 1 of the outer shell formed by the first component part 41*a* and a second component part 42*a* is flush as shown in FIG. 5 or 11 without any unintentional ridges or protrusions formed on the inner surface 1. This is particularly beneficial when the outer shell is used for a dispenser in which the product to be dispensed moves past the inner surface 1 at the seam. Due to the configuration without any protrusions or ridges, a damaging of the product to be dispensed which could potentially interfere with the protrusions or ridges may be avoided.

It is also clear from these drawings that the outer surface 2 of the first component part 41*a* and the second component part 42*a* may be flush. Because of the exact positioning, a gap formed between the step 44 and the free edge of the second component part 42*a* may be reduced to a minimum and even be closed and connected during the injection molding process. Accordingly, no dirt may accumulate in this gap which is particularly beneficial, if the dispenser is disposed in a delicate environment such as a hospital or clean rooms.

FIG. 12 shows a first example of a dispenser comprising an outer shell according to the disclosure. In this example, an outer shell 90 is formed by a transparent first component part 91 and an opaque second component part 92. The first component part 91 and the second component part 92 are joined by a seam 93 extending from a first side edge 94 to a second side edge 95 of the outer shell 90. The component parts 91, 92 can be joined by any one of the seams described in connection with FIGS. 6 to 9. The outer shell 90 is detachably joined to a rear dispenser section 96 in order to form a dispenser housing 97. The rear dispenser section 96 is arranged to be mounted on a vertical surface, such as a wall. In this example, the dispenser housing 97 is intended for a dispenser for a stack of paper towels or similar, which are removed through a dispenser opening 98 in a lower surface of the dispenser.

Figure 13:
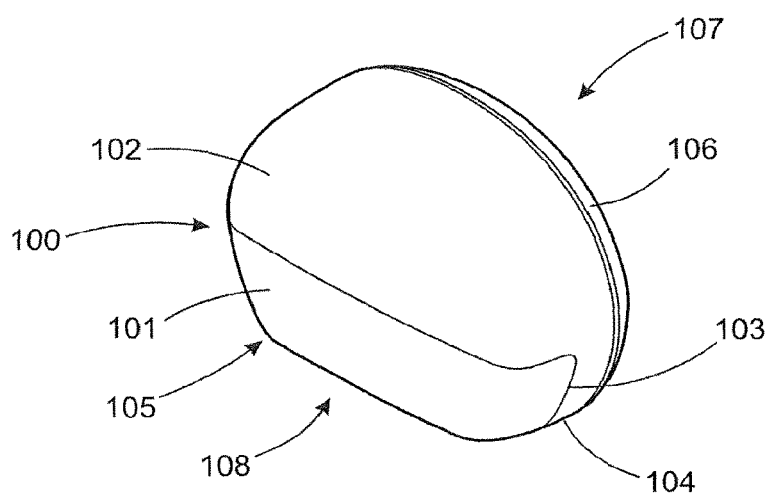
FIG. 13 is a perspective view of a dispenser comprising an outer shell according to another embodiment of the invention.

FIG. 13 shows a second example of a dispenser comprising an outer shell according to the disclosure. In this example, an outer shell 100 is formed by a transparent first component part 101 and an opaque second component part 102. The first component part 101 and the second component part 102 are joined by a seam 103 extending from a first side edge 104 to a second side edge 105 located along a lower delimiting section of the outer shell 100. The component parts 101, 102 can be joined by any one of the seams described above. The outer shell 100 is detachably joined to a rear dispenser section 106 in order to form a dispenser housing 107. The rear dispenser section 106 is arranged to be mounted on a vertical surface, such as a wall. In this example, the dispenser housing 107 is intended for a dispenser for a roll of paper or similar, which is removed through a dispenser opening 108 in a lower surface of the dispenser.

Figure 14:
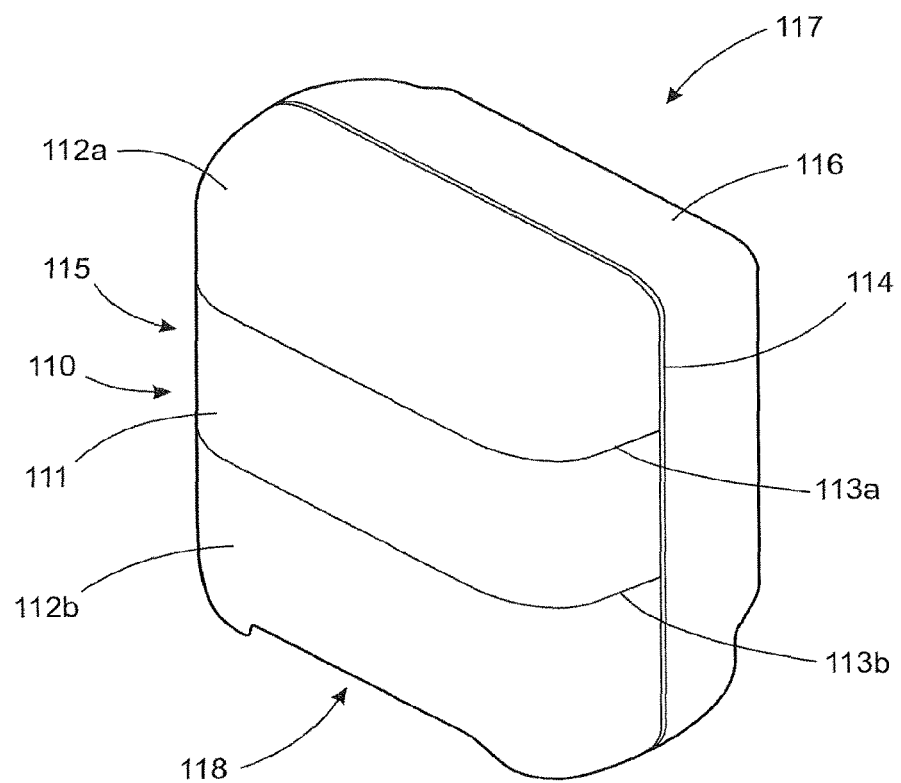
FIG. 14 is a perspective view of a dispenser comprising an outer shell according to the disclosure.

FIG. 14 shows a third example of a dispenser comprising an outer shell according to the disclosure. In this example, an outer shell 110 is formed by a central transparent first component part 111 and an upper and a lower opaque second component part 112*a*, 112*b*. The first component part 111 and the second component parts 112*a*, 112*b* are joined by seams 113*a* and 113*b*, respectively. Both seams 113*a*, 113*b* extend in parallel from a first side edge 114 to a second side edge 115 of the outer shell 110. The component parts 111, 112*a*, 112*b* can be joined by any one of the seams described in connection with FIGS. 6 to 9. The outer shell 110 is detachably joined to a rear dispenser section 116 in order to form a dispenser housing 117. The rear dispenser section 116 is arranged to be mounted on a vertical surface, such as a wall. In this example, the dispenser housing 117 is intended for a dispenser for a stack of paper towels or similar which are removed through a dispenser opening 118 in a lower surface of the dispenser.

When selecting materials, it may be determined that the resins used are generally compatible with no antagonistic effects between resins. Suitable materials for use in the above method are acrylonitrile butadiene styrene (ABS) plastics and/or methyl methacrylate-ABS (MABS) plastics. However, these materials are given by way of example only and the disclosure is not limited to these materials. The materials tested in the examples below are Terlux® TR2802 MABS (BASF Corp.) or Polylux® C2 MABS (A. Schulman GmbH) for the transparent first component part and Polyman® M/MI A40 ABS (A. Schulman GmbH) for the opaque second component part.

The disclosure is not limited to the above examples, but may be varied freely within the scope of the appended claims. For instance, in the above examples a combination of transparent and opaque materials are described. In addition, combinations of one or more colored and/or transparent materials may be used. Also, the examples describe a single seam extending horizontally or at an angle across the outer (or front) surface of the outer shell. Alternative solutions may comprise one or more seams arranged vertically or to enclose a single corner. The seams need not only be located along a straight line as described above, but can also be given a curved, wavy or an irregularly shaped line. To this end, the embodiments described above are only descriptions of preferred embodiments of the present invention, and are not intended to limit the scope of the present invention. Various variations and modifications can be made to the technical solution of the present invention by those of ordinary skill in the art, without departing from the design of the present invention. The variations and modifications should all fall within the claimed scope defined by the claims of the present invention.

What is claimed is:

1. A method of manufacturing an outer shell of a dispenser part, the method comprising:
    performing a first injection moulding step to produce a first component part of the outer shell in a mould, wherein the first component part comprises an outer surface and an inner surface, wherein the first component part has a first mating surface directed to the outer surface of the first component part, the first mating surface including at least one step extending between the outer surface and the inner surface of the first component part;
    performing a second injection moulding step to produce a second component part in the mould, wherein the second component part comprises an outer surface and an inner surface, wherein the second component part has a second mating surface directed to an inner surface of the second component part, wherein the first component part and the second component part are joined to each other along a seam by mating the first mating surface and the second mating surface during the second injection moulding step; and
    retaining the first component part in the mould and engaging a plurality of protrusions provided on a surface of the mould via a plurality of recesses formed in the first component part during the second injection moulding step, the plurality of recesses being formed at the inner surface of the first component part along at least a part of an inner end of the first mating surface of the first component part and/or on a gate protrusion extending away from a free end of the first mating surface of the first component part; and
    wherein the plurality of protrusions are provided with an undercut.

2. The method of claim 1, wherein the undercut has an angle between 3° and 20°.

3. The method of claim 1, wherein the plurality of protrusions are arranged in a row.

4. The method of claim 3, wherein the height of the plurality of protrusions is lowest at opposite ends of the row and highest in a center between the opposite ends.

5. The method of claim 1, wherein the plurality of protrusions have a rectangularly shaped top view, a square shaped top view, or a circular shaped or oval shaped top view.

6. The method of claim 5, wherein one edge of the rectangularly shaped top view extends parallel to the free end of the first mating surface and/or a free end of the gate protrusion.

7. The method of claim 1, wherein the mould is moved from a first cavity to a second cavity between the first injection moulding step and the second injection moulding step while retaining the first component part in the mould.

* * * * *